US012139361B2

(12) United States Patent
Helmlinger et al.

(10) Patent No.: US 12,139,361 B2
(45) Date of Patent: Nov. 12, 2024

(54) FEEDER FOR FEEDING DOCUMENT TO DOCUMENT IMAGING SYSTEM AND METHOD FOR FEEDING DOCUMENTS

(71) Applicant: OPEX Corporation, Moorestown, NJ (US)

(72) Inventors: David Helmlinger, Mount Laurel, NJ (US); Gary Miller, Medford, NJ (US); Peter M. Chezik, Sicklerville, NJ (US); Robert R. DeWitt, Marlton, NJ (US)

(73) Assignee: OPEX Corporation, Moorestown, NJ (US)

( * ) Notice: Subject to any disclaimer, the term of this patent is extended or adjusted under 35 U.S.C. 154(b) by 0 days.

(21) Appl. No.: 17/103,645

(22) Filed: Nov. 24, 2020

(65) Prior Publication Data

US 2021/0188577 A1 Jun. 24, 2021

Related U.S. Application Data

(60) Continuation of application No. 15/830,840, filed on Dec. 4, 2017, now Pat. No. 10,906,761, which is a (Continued)

(51) Int. Cl.
*B65H 3/54* (2006.01)
*B07C 3/00* (2006.01)
(Continued)

(52) U.S. Cl.
CPC ................. *B65H 3/54* (2013.01); *B07C 3/00* (2013.01); *B65H 3/047* (2013.01); *B65H 3/0669* (2013.01);
(Continued)

(58) Field of Classification Search
CPC .... B65H 3/0669; B65H 3/0676; B65H 5/068; B65H 5/26; B65H 7/14; B65H 7/20; B65H 29/125; B65H 2511/13; B65H 2511/20
See application file for complete search history.

(56) References Cited

U.S. PATENT DOCUMENTS 3,143,100 A 8/1964 Krupotich
3,266,626 A 8/1966 Simjian
(Continued)

FOREIGN PATENT DOCUMENTS

EP 1323653 7/2003
JP 36-1166447 7/1986
(Continued)

OTHER PUBLICATIONS

International Search Report & Written Opinion issued in PCT/US11/33106 on Dec. 19, 2011.
(Continued)

*Primary Examiner* — Thomas A Morrison
(74) *Attorney, Agent, or Firm* — Brian Dinicola

(57) ABSTRACT

A method and apparatus for processing documents are provided. The apparatus includes a feeder for receiving a packet of a plurality of documents and separating the documents to serially feed the documents to a scanner. A drop feeder conveys the document packets to the feeder. A sensor provides information related to the thickness of the document packets and the drop feeder is controlled in response to the information related to the thickness of a packet in the feeder. The method includes the control of the drop feeder in response to information related to the thickness of a document packet at the feeder.

18 Claims, 8 Drawing Sheets

Related U.S. Application Data continuation of application No. 14/751,357, filed on Jun. 26, 2015, now Pat. No. 9,932,184, which is a division of application No. 13/090,172, filed on Apr. 19, 2011, now Pat. No. 9,079,730.

(60) Provisional application No. 61/325,790, filed on Apr. 19, 2010.

(51) Int. Cl.

| | |
|---|---|
| ***B65H 3/04*** | (2006.01) |
| ***B65H 3/06*** | (2006.01) |
| ***B65H 3/52*** | (2006.01) |
| ***B65H 5/02*** | (2006.01) |
| ***B65H 5/06*** | (2006.01) |
| ***B65H 5/26*** | (2006.01) |
| ***B65H 7/14*** | (2006.01) |
| ***B65H 7/20*** | (2006.01) |
| ***B65H 29/12*** | (2006.01) |
| ***B65H 29/68*** | (2006.01) |
| ***B65H 29/70*** | (2006.01) |
| ***B65H 37/00*** | (2006.01) |

(52) U.S. Cl.

CPC ........... *B65H 3/0676* (2013.01); *B65H 3/523* (2013.01); *B65H 3/5238* (2013.01); *B65H 5/023* (2013.01); *B65H 5/025* (2013.01); *B65H 5/066* (2013.01); *B65H 5/068* (2013.01); *B65H 5/26* (2013.01); *B65H 7/14* (2013.01); *B65H 7/20* (2013.01); *B65H 29/125* (2013.01); *B65H 29/68* (2013.01); *B65H 29/70* (2013.01); *B65H 37/00* (2013.01); *B65H 2220/01* (2013.01); *B65H 2301/422615* (2013.01); *B65H 2301/42262* (2013.01); *B65H 2301/5111* (2013.01); *B65H 2301/5125* (2013.01); *B65H 2408/11* (2013.01); *B65H 2511/13* (2013.01); *B65H 2511/20* (2013.01); *B65H 2511/30* (2013.01); *B65H 2511/512* (2013.01); *B65H 2513/512* (2013.01); *B65H 2553/30* (2013.01); *B65H 2701/1916* (2013.01)

(56) References Cited

U.S. PATENT DOCUMENTS

| | | | | |
|---|---|---|---|---|
| 3,612,511 | A * | 10/1971 | Godlewski .............. | B65H 3/46<br>271/35 |
| 3,728,020 | A | 4/1973 | Abrams et al. | |
| 3,884,010 | A | 5/1975 | Barbo et al. | |
| 4,124,968 | A | 11/1978 | Stevens et al. | |
| 4,233,800 | A | 11/1980 | Long et al. | |
| 4,333,300 | A | 6/1982 | Russell | |
| 4,353,197 | A | 10/1982 | Stevens et al. | |
| 4,576,287 | A | 3/1986 | Bingham et al. | |
| 4,616,815 | A | 10/1986 | Vijuk | |
| 4,649,694 | A | 3/1987 | Haley | |
| 4,863,037 | A | 9/1989 | Stevens et al. | |
| 4,866,908 | A | 9/1989 | Kunne et al. | |
| 4,893,454 | A | 1/1990 | Russell | |
| 4,921,388 | A | 5/1990 | Nelson | |
| 4,934,892 | A | 6/1990 | Smith et al. | |
| 4,968,419 | A | 11/1990 | Karalus et al. | |
| 5,004,217 | A | 4/1991 | Kano et al. | |
| 5,052,168 | A | 10/1991 | DeWitt et al. | |
| 5,052,875 | A | 10/1991 | Miller et al. | |
| 5,054,620 | A | 10/1991 | DeWitt et al. | |
| 5,054,700 | A | 10/1991 | DeWitt et al. | |
| 5,096,360 | A | 3/1992 | Nelson | |
| 5,115,918 | A | 5/1992 | DeWitt et al. | |
| 5,134,834 | A | 8/1992 | Hayduchok | |
| 5,156,515 | A | 10/1992 | Charron et al. | |
| 5,175,979 | A | 1/1993 | Van der Werff et al. | |
| 5,178,224 | A | 1/1993 | DiGuilo et al. | |
| 5,211,388 | A | 6/1993 | Walluk | |
| 5,240,116 | A | 8/1993 | Stevens et al. | |
| 5,293,431 | A | 3/1994 | Hayduchok et al. | |
| 5,310,062 | A | 5/1994 | Stevens et al. | |
| 5,318,287 | A | 6/1994 | Okayama | |
| 5,440,861 | A | 8/1995 | Lund | |
| 5,460,273 | A | 10/1995 | Stevens et al. | |
| 5,464,099 | A | 11/1995 | Stevens et al. | |
| 5,508,818 | A | 4/1996 | Hamma | |
| 5,540,338 | A | 7/1996 | Stevens et al. | |
| 5,558,232 | A | 9/1996 | Stevens et al. | |
| 5,655,668 | A | 8/1997 | Drenth | |
| 5,662,321 | A | 9/1997 | Borostyan et al. | |
| 5,675,671 | A | 10/1997 | Hayduchok et al. | |
| 5,727,692 | A | 3/1998 | Large et al. | |
| 5,810,173 | A | 9/1998 | Stevens et al. | |
| 5,842,577 | A * | 12/1998 | Stevens .................. | G06K 9/186<br>209/3.3 |
| 5,901,951 | A | 5/1999 | Yamaguchi | |
| 5,924,840 | A | 7/1999 | Charron et al. | |
| 5,926,392 | A | 7/1999 | York | |
| 6,000,689 | A | 12/1999 | Furuki et al. | |
| 6,003,857 | A | 12/1999 | Salomon et al. | |
| 6,039,315 | A | 3/2000 | Lim | |
| 6,112,902 | A | 9/2000 | Hayduchok et al. | |
| 6,135,441 | A * | 10/2000 | Belec ..................... | B65H 3/045<br>271/121 |
| 6,151,422 | A | 11/2000 | Hayduchok et al. | |
| 6,186,146 | B1 | 2/2001 | Glickman | |
| 6,196,393 | B1 | 3/2001 | Kruk, Jr. et al. | |
| 6,219,647 | B1 | 4/2001 | Hidding et al. | |
| 6,230,471 | B1 * | 5/2001 | Robertson ................ | B43M 7/02<br>53/381.3 |
| 6,311,846 | B1 | 11/2001 | Hayduchok et al. | |
| 6,360,447 | B1 | 3/2002 | Foley | |
| 6,505,534 | B2 | 1/2003 | Robertson et al. | |
| 6,520,497 | B2 | 2/2003 | Tamura | |
| 6,585,252 | B1 | 7/2003 | Russo et al. | |
| 7,481,419 | B2 | 1/2009 | Kim | |
| 7,537,203 | B2 * | 5/2009 | DeWitt ..................... | B07C 3/00<br>270/52.01 |
| 7,706,914 | B2 | 4/2010 | Hayduchok | |
| 7,798,485 | B2 | 9/2010 | Tu et al. | |
| 7,916,892 | B2 | 3/2011 | Hayduchok | |
| 8,408,536 | B2 | 4/2013 | Liu | |
| 2002/0140156 | A1 * | 10/2002 | Wilson ..................... | B65H 7/18<br>271/10.07 |
| 2005/0067751 | A1 | 3/2005 | Panunto et al. | |
| 2006/0219601 | A1 | 10/2006 | Babanats et al. | |
| 2007/0145670 | A1 | 6/2007 | Asada | |
| 2008/0054544 | A1 | 3/2008 | Calverley et al. | |
| 2008/0290584 | A1 | 11/2008 | Dunn | |
| 2010/0052237 | A1 | 3/2010 | Herczeg et al. | |
| 2011/0197552 | A1 * | 8/2011 | Jones .................. | B65B 69/0033<br>53/381.2 |

FOREIGN PATENT DOCUMENTS

| | | |
|---|---|---|
| JP | 401060529 | 3/1989 |
| JP | 2002060075 | 2/2002 |
| JP | 2003128318 | 5/2003 |
| JP | 2006225075 | 8/2006 |
| WO | 8901580 | 2/1989 |
| WO | 9928223 | 6/1999 |

OTHER PUBLICATIONS

Model 2050 Master Workstation Remittance System 2000, Lundy, Recognition Equipment Incorporated, Copyright 1992, 4 pages.

DocuScan 9000, BancTec, published before Apr. 19, 2010, 3 pages of product brochure.

Imaging Business Machines provides Solutions brochure, published before Apr. 19, 2010, 4 pages.

(56) References Cited

OTHER PUBLICATIONS

LS 515 Document Reader-Scanner product brochure, published before Apr. 19, 2010, 1 page.
Open Scan product brochure, published before Apr. 19, 2010, 4 pages.
Examination Report issued in European Patent Application No. 11772579.6 on Mar. 23, 2015.
Extended Search Report issued in European Patent Application No. 11772579.6 on Apr. 14, 2014.

* cited by examiner

FEEDER FOR FEEDING DOCUMENT TO DOCUMENT IMAGING SYSTEM AND METHOD FOR FEEDING DOCUMENTS

PRIORITY CLAIM

This application is a continuation of U.S. patent application Ser. No. 15/830,840 filed on Dec. 4, 2017, which is a continuation of U.S. patent application Ser. No. 14/751,357 filed on Jun. 26, 2015, now issued as U.S. Pat. No. 9,932,184, which is a divisional application of U.S. application Ser. No. 13/090,172 filed Apr. 19, 2011, now issued as U.S. Pat. No. 9,079,730, which claims priority to U.S. Provisional Patent Application No. 61/325,790, filed Apr. 19, 2010. The entire disclosure of each of the foregoing applications is hereby incorporated herein by reference.

FIELD OF THE INVENTION

The present invention relates to the field of document processing. In particular the present application relates to feeding documents to a device for further processing of the documents. The present invention finds particular application to the field of document imaging in which documents are to be fed to an imaging system, such as a document scanner.

BACKGROUND

Automated and semi-automated machines have been employed for processing documents. Further, in many instances it is desirable to obtain image data of the documents. However, often the documents are obtained in packets so that the individual documents in a packet need to be separated to be scanned. Although advances have been made in the processing of such packets, an improved system for feeding packets with minimal manual preparation is desirable.

SUMMARY OF THE INVENTION

In light of the foregoing, an apparatus is provided for improving the semi-automated processing of packets of documents. The apparatus includes a feeder operable to receive a packet of a plurality of documents and separate the documents to serially feed the documents away from the feeder. The apparatus further includes a retard pad adjacent the feeder operable in a first position and a second position, wherein in the first position the feeder forms a nip with the feeder so that the retard is operable to impede the progress of one or more documents in a packet while the feeder feeds one of the documents in the packet. In the second position, the retard is spaced apart from the feeder to form a gap between the feeder and the retard; A sensor is provided for detecting a characteristic of the documents in the packet indicative of whether the number of documents in the packet exceeds a predetermined threshold. A drive mechanism automatically drives the retard pad between the first and second positions in response to the detected characteristic.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
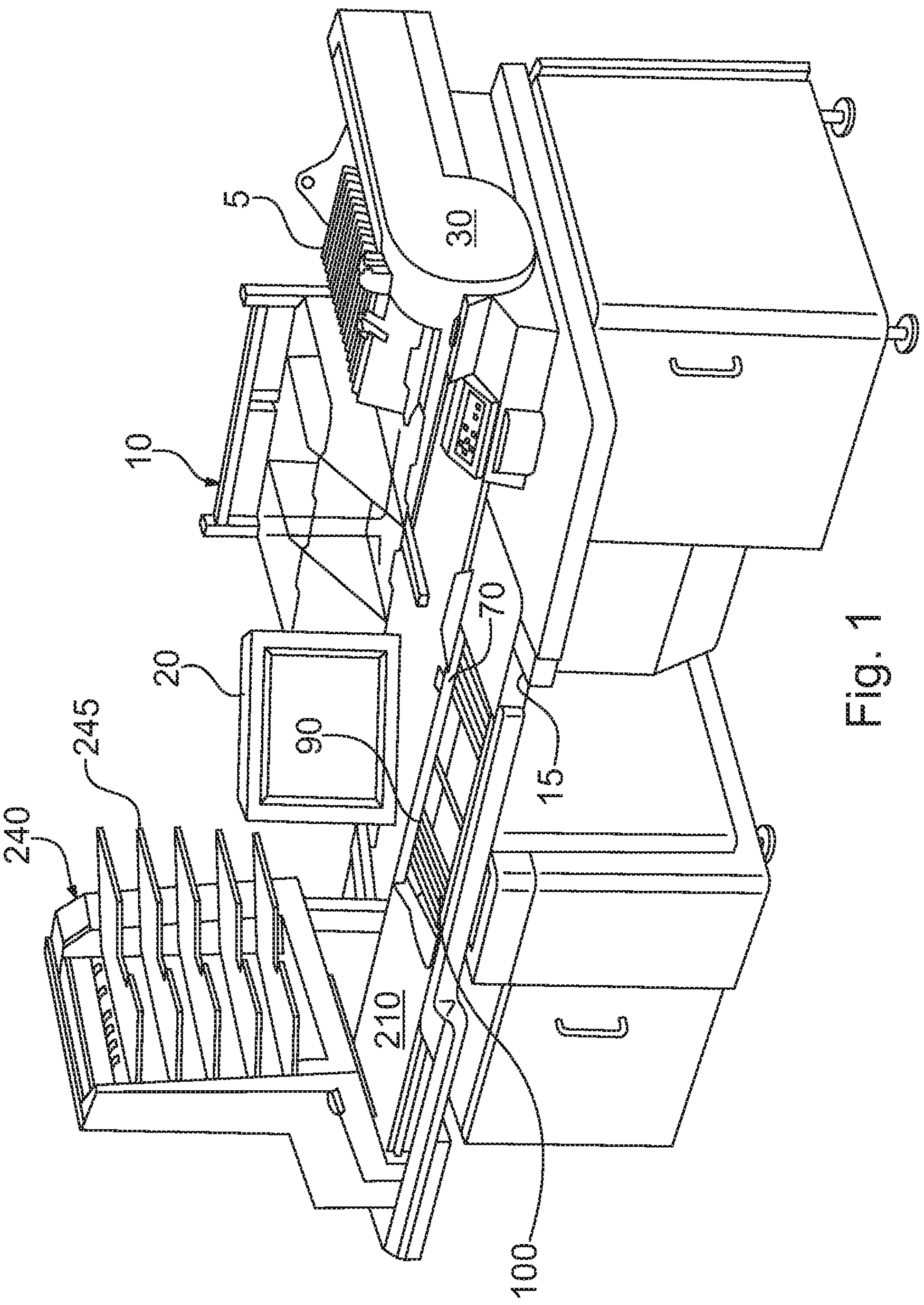
FIG. 1 is a perspective view of a document processing system.

Referring now to the figures in general and to FIG. 1 in particular, a document processing workstation 10 is illustrated. The workstation 10 processes mail by severing one or more edges of each envelope in a stack of mail and presenting the edge-severed envelopes one at the time to an operator who removes the documents from the envelope by hand. The operator can then drop the extracted documents individually or in stacks onto a conveyor that conveys the documents to an imaging station. The imaging station separates the documents, serially feeding the documents to an imager that obtains image data for the documents. The documents are then sorted into one or more output bins.

The present system is directed to improving the flow of documents in a document processing system. The system has particular application to workstations directed to processing documents and has particular application to processing packets of documents to scan the documents to obtain image data. In an exemplary embodiment, the workstation is configured as a semi-automated system for processing mail in the form of documents contained within envelopes. However, it should be understood that several aspects of the present system have application to systems that do not incorporate document extraction features, but are instead directed to processing documents generally. For instance, in the following description, an exemplary embodiment includes stations for cutting open envelopes and opening the envelopes so that the user can manually extract the documents. The system further includes a horizontal conveyor onto which the documents are dropped and then conveyed to a scanning station. From the scanning station, the documents are conveyed to a sorting station. Although the various stations are described in the exemplary embodiment, the present system is not limited to such an embodiment. For instance, features of the present system may be incorporated into a system that does not include the extraction features, but includes the horizontal conveyor, scanning station and sorting station. Further still, features of the system may have application generally in a document processing system in which it is desirable to manually feed packets of documents into the system without organizing or otherwise preparing the packets for feeding into the system.

Brief Overview

With the foregoing in mind, a general overview of the flow of documents in an exemplary system for processing mail is as follows. Initially, a stack of envelopes containing documents, referred to as a job, is placed into an input bin. A feeder 30 removes the lead envelope 5 from the front of the stack and transfers the envelope to a feed tray.

The envelope 5 in the feed tray is edge-justified by a plurality of opposing rollers. From the feed tray, the envelope 5 drops into a side cutter, which severs the side edge of the envelope if desired. From the side cutter, the envelope drops into a shuttle. The shuttle moves vertically to adjust the height of the top edge of the envelope to account for variations in the height of the different envelopes in the job. The shuttle moves vertically until the height of the top edge of the envelope 5 is within an acceptable range for advancing the envelope into a top cutter. The envelope is then transported to the top cutter, which severs the top edge of the envelope 5.

From the top cutter the envelope is advanced to an extraction station 70. The extraction station 70 pulls apart the front and back faces of the envelope to present the contents of the envelope for removal. An operator then manually removes the contents from the envelope 5.

After the operator removes the documents from the envelope 5, the apparatus 10 automatically advances the envelope to a verifier 90. The verifier 90 verifies that all of the documents were removed from the envelope before the envelope is discarded. From the verifier 90 the envelope is conveyed into a waste container. Alternatively, the envelope 5 may be manually removed and imaged at the imaging station 210.

After the documents are extracted at the extraction station, the operator unfolds as needed and drops or places the extracted documents onto a drop conveyor 100 that transports the documents toward an imaging station 210. An imaging entry feeder 110 receives the documents from the drop conveyor 100 and controls the feeding of the documents into the imaging station 210. The image entry feeder 110 is configured to receive and feed documents of various sizes and condition. For instance, frequently documents are folded in an envelope. When the documents are extracted and opened up, the documents are creased or folded so that they do not lie flat. The feeder 110 is preferably configured to receive such creased or folded documents and serially feed the folded documents into the imaging station 210 with minimal manual preparation by the operator.

The imaging station 210 includes an imager 230 that obtains image data for each document as the document is conveyed past the device. For instance, preferably the imager 230 is a scanner that obtains gray scale or color image data representing an image of each document. The scanner scans each document at a plurality of points as the document is conveyed past the scanner. The information for each document is stored in a data file for each document so that the image data can be accessed at a later time.

From the imaging device, preferably an imaging transport conveys the documents to a sorting station 240 that sorts the documents into a plurality of output bins 245. The documents can be sorted in a variety of ways. For instance, the documents can be sorted based on document information obtained from the image data received at the imaging station 210. Alternatively, the operator may indicate information regarding a document before it is scanned, so that the document is sorted according to the information indicated by the operator. Yet another alternative is that the documents may be stacked into one or more bins simply based on the order in which the documents are processed.

Since many of the documents may be creased, ordinarily the documents will not readily stack in a compact manner so that relatively fewer creased documents can be discharged into a bin before the bin is full. Accordingly, the documents may be processed by an uncreaser, which is an element that reduces the creasing or folds in the documents. The uncreaser flattens or straightens the documents so that they lay more flatly in the output bins so that more documents can be discharged into a bin before the bin is full.

A controller controls the processing of the mail in response to signals received from various sensors at various locations of the workstation 10 and in response to parameters set for the job by the operator. For instance, in response to an indication from a sensor in the feed tray that there is no envelope in the feed tray, the controller sends a signal to the feeder envelope 30 indicating that an envelope should be fed from the input bin to the feed tray. Similarly, in response to an indication from a sensor in the shuttle that there is no envelope in the shuttle, the controller sends a signal to the feed tray indicating that an envelope should be dropped from the feed tray into the shuttle.

As shown in FIG. 1, the workstation 10 is divided into numerous functionally separate sections, which include: a feeding station 30, a side cutting station, a top cutting station, the extraction station 70, the verification station 90, the imaging station 110, a controller 116, and the sorting station 240. In most cases, the controller 116 controls the operation of the various sections independently from each other. This independence allows several operations to proceed simultaneously or asynchronously as required. As a result, a slow down in one section does not necessarily slow down all of the other sections.

In addition, preferably the operations of the apparatus from the drop conveyor through the sorting station are controlled separately from the operation of the other stations. Further, preferably, an operator interface is provided so that the operator can intervene to control the processing of the documents. Specifically, preferably a touch screen display 20 is provided that allows the operator to enter various information regarding the documents.

Configuration of the Work Station

As can be seen in FIG. 1, preferably the workstation 10 is configured so that an operator working at the workstation has ready access to each working area. A seating area 15 at the front of the apparatus is centrally located, and the different stations are disposed around the seating area with the paper path flowing in a manner that the documents remain within easy access of the operator at the seating area.

Specifically, preferably, the feeding station 30 is disposed adjacent the right side, however, the feeding station can be located on the left side if desired. From the feeding station 30, the mail pieces are fed along a document path that extends across the workstation along the width of the workstation. Preferably, the extraction station is substantially aligned with the seating area 15 relative to the right and left edges of the workstation so that the operator can readily grasp the mail at the extractor during operation. For instance, preferably the extraction station is generally centered between the right and left edges of the workstation.

The drop conveyor 100 is preferably located adjacent the front edge of the workstation and is disposed between the extraction station 70 and the seating area 15 so that the operator reaches over a portion of the drop conveyor to grasp documents at the extraction station. More specifically, preferably a portion of the drop conveyor 100 is disposed adjacent the seating area 15 at the front edge of the workstation. In this way, the operator can readily view, unfold and drop documents from the extraction station 70 onto the drop conveyor 100 when pulling the documents back toward himself/herself.

The drop conveyor 100 conveys the dropped documents away from adjacent the seating area 15, along a path that is generally parallel to the front edge of the workstation. Preferably the document path from the imaging station 210 to the output bins 245 returns toward the seating area. In this way, the output bins 245 are disposed conveniently near the operator at the seating area, so that the operator can readily remove processed documents from the output bins while the operator is at the seating area.

Details of the Stations

Feeding and Edge Cutting Stations

The feeding station 30 includes an input bin and a feeder. The input bin is configured to receive a stack of mail and convey it to the feeder. The feeder comprises a pivoting arm with a suction cup that grasps an envelope from the stack of mail and transports the piece to a side cutting station. In this way, the feeder serially feeds mail from the stack of mail.

The side cutting station includes a plurality of drive rollers and opposing idler rollers. As the envelope passes between the rollers a rotary knife severs the side edge of the envelope. The severed edge drops down a scrap chute into a waste container.

From the side cutting station, the envelopes are top edge-justified so that the top edge remains at a consistent height. The envelopes may be justified by a pair of rollers to drive the envelopes upwardly against a stop at a predetermined height. However, such a roller justifier is typically limited to justifying envelopes that are similar in height. If there is too much variation among the envelopes in a batch of mail the justifier may not be able to properly justify the envelopes. For instance, if an envelope in a batch is unusually high, the top edge of the envelope may be positioned too high as it enters the justifier so that it causes a jam. If the envelope is unusually low, the top edge of the envelope may not engage the justifier rollers so that the envelope is not justified.

Accordingly, in order to accommodate a variety of envelopes, preferably the apparatus includes a shuttle that moves up and down to position the top edge of each envelope at approximately the proper height. The envelopes then enter the top-edge justifier to justify the top edge of the envelopes. The shuttle is a bin that receives each envelope and moves up or down as necessary to adjust the height of the top edge of each envelope as necessary depending upon the height of each envelope.

After the envelopes are top edge-justified, the envelopes are conveyed to a top cutting station that severs the top edge of the envelopes. In this way, the top and leading edge of each envelope is cut by the two cutting stations. Optionally, the side cutting station can be configured so that both sides of each envelope is severed. Yet another option is to eliminate or disable the side cutters so that only the top edge of the envelopes is opened.

Extraction Station

The extraction station 70 operates to pull apart the faces of the edge-severed envelopes and present the contents so that an operator can easily remove the documents. After the operator removes the contents, a sensor sends a signal to the controller that the contents have been extracted. The empty envelope is then transported to the verification station 90 and another envelope is fed to the extraction station 70.

Referring now to FIG. 9, the extraction station 70 includes a pair of opposing vacuum suction cups mounted on two pivotal extractor arms. The suction cups are connected to a vacuum pump. In the first position, the extractor arms are pivoted away from one another. In the second position the extractor arms are pivoted toward one another.

As shown in FIG. 1 the extraction station 70 is positioned in front of the seating area 15 intermediate the front and rear edges of the workstation. Before an envelope enters the extraction station, the extractor arms are pivoted away from one another. When the envelope enters the extractor, the arms pivot toward one another and negative pressure is supplied to the suction cups so that the suction cups engage the faces of the envelope. The arms then pivot away from one another pulling apart the faces of the envelope, which have been severed along the top edge and preferably the side edge. The operator can then remove the contents of the envelope.

The document transport pinches the envelope between idler rollers and a belt. Therefore, when the extractor arms pull apart the faces of the envelope, the envelope and its contents remain pinched between the idler rollers and the belt. To remove the contents, the operator pulls the contents with enough force to overcome the friction between the envelope and the contents caused by the pinching action of the extraction transport. In addition, this friction is maintained until the bottom edge of the contents is pulled past the pinch point.

Verification Station

The verification station 90 checks the thickness of each envelope to ensure that all of the contents have been removed from the envelope before the envelope is discarded into the waste container. The verifier 90 can use an optical sensor to check the thickness of the envelope, similar to the optical sensor or sensors used by the extraction station 70. However, the verifier preferably checks the thickness of the envelope by measuring the distance between the outer surfaces of the envelope faces. To measure this distance, the verifier 90 includes a rotary variable inductive transducer (RVIT).

If the verifier 90 measures a thickness that is greater than the reference value, then a signal is sent to the controller indicating that the envelope in the verifier 90 is not empty. An indicator light (not shown) is lit indicating to the operator that the envelope at the verifier should be removed and checked to ensure that all of the contents were removed. A verifier sensor adjacent the RVIT sensor detects the presence of the envelope in the verifier 90. Until the operator removes the envelope from the verifier, the document transport will not advance any envelopes, regardless of whether the envelope in the extraction station 70 is empty.

If the verifier 90 detects a thickness that is less than the reference value, a signal is sent to the controller indicating that the envelope at the verifier is empty. The controller then activates the document transport to advance the envelope out of the extractor and into a trash chute that discards the envelope into the waste container beneath the verifier 90.

The operation of the feeding station 30, side and top cutting stations and extraction station 70 are similar to the operation of the apparatus described in U.S. Pat. No. 7,537,203, which is owned by Opex Corporation, who is also the assignee of the present patent application. U.S. Pat. No. 7,537,203 is hereby incorporated herein by reference. In addition, alternative feeding and cutting stations could be incorporated into the present apparatus.

The following description discusses the processing and imaging of documents that have been extracted from opened envelopes in the manner discussed above. However, in certain applications, the apparatus is operable to process documents without using the extraction features of the apparatus. For instance, the apparatus may be used to process a batch of documents that have been previously extracted, such as documents that are rejected by high speed automated processing devices. For such documents it is advantageous to use the feeding and scanning features as discussed below. Similarly, a batch of pre-slit mail may be processed, whereby the operator manually opens the slit envelopes and then processes the documents as discussed further below. Accordingly, unless otherwise noted below, the following discussion of the document imaging process is applicable to a variety of applications in which a batch of documents needs to be imaged, without regard to how the documents are obtained (i.e. the documents are provided in a stack as opposed to documents that must be extracted from envelopes). Features of the present invention are not limited to applications in which system includes the envelope opening and extraction features discussed above.

Drop Conveyor

Referring to FIG. 1, the drop conveyor 100 is configured to receive documents extracted from the envelopes. The conveyor 100 is disposed along the front edge of the workstation 10, such that the conveyor is operable to convey documents adjacent to and parallel to the front edge of the workstation. In addition, the conveyor preferably conveys the dropped documents toward the left hand side of the workstation from the perspective of FIG. 1.

Preferably the conveyor 100 is configured to readily receive documents that the operator manually removes from an envelope at the extractor. More specifically, the conveyor is configured to receive documents that are simply dropped onto the conveyor and then convey the dropped documents to the imaging station 210. In this way, the operator can readily extract and, if necessary, unfold documents and simply drop a document or packet of documents onto the conveyor with minimal preprocessing of the documents to prepare the documents for scanning.

Although the operator preferably drops the documents onto the drop zone of the conveyor, the drop zone is a substantial area that is much larger than the documents. Accordingly, the operator does not need to be precise with the location and orientation that the documents are dropped onto on the conveyor. However, preferably the operator drops the documents so that the documents are front face up on the conveyor.

To this end, preferably the conveyor 100 is a roller bed conveyor. The bed of rollers provides a generally horizontal surface onto which documents can be dropped. The roller bed comprises a plurality of horizontally disposed cylindrical rollers driven by a belt engaging the bottom of the rollers, which in turn is driven by a motor controlled by the system controller. The rollers 102 may be parallel to each other and perpendicular to the direction of travel so that the documents move straight along the roller bed 100. However, preferably, the rollers are skewed so that the rollers drive the documents forwardly along the roller bed and laterally toward a justification rail 105. In this way, the skewed rollers 102 drive the documents against the rail 105 to edge-align or justify an edge of the documents against the rail.

Each of the rollers 102 comprises a plurality of grooves sized to receive O-rings. The O-rings have a higher coefficient of friction than the surface of the rollers, to provide an area of increased friction between the roller bed and the documents, thereby improving the justification of the documents. As mentioned previously, the document rests on the rollers. Therefore, as the rollers 102 rotate, the rollers move the documents forwardly.

Although, the drop conveyor 100 has been described as a roller bed conveyor, alternative types of conveyors can be utilized as the drop conveyor. For instance, the drop conveyor may comprise a horizontal conveyor belt. If a conveyor belt is used, preferably the belt is skewed toward the rail 105 so that the belt justifies the documents against the rail. Alternatively, rather than a single conveyor belt, the drop conveyor may comprise a plurality of smaller conveyor belts onto which the documents may be dropped.

Although the conveyor 100 is referred to as a horizontal conveyor, preferably the drop conveyor is angled downwardly so that gravity urges the documents toward the guide rail 105. Preferably the conveyor 100 is angled at approximately five degrees, however, the angle may be higher, and in fact, the angle of the conveyor may be increased to a point that the conveyor is vertical rather than horizontal. In addition, preferably the imaging station and sorting station are angled downwardly similarly to the drop conveyor.

Image Entry Feeder

Referring to FIGS. 2-8 the details of the image entry feeder 110 will be described in greater detail. The image entry feeder is position adjacent the end of the drop conveyor 110, so that the drop feeder conveys the documents to the image entry feeder, which in turn feeds the documents to the imaging station 210. As the documents are conveyed to the image entry feeder 110, the documents are generally horizontally disposed, riding on top of the drop conveyor 100 and are edge-aligned against the justification rail 105.

The image entry feeder 110 is operable to serially feed documents from the drop conveyor 100 to the imaging station 210 so that the documents can be individually imaged. The image entry feeder 110 is operable to receive a number of different types of documents, including individual documents, envelopes, and packets of documents. In the following discussion, a packet of documents should be understood to mean a group of two or more documents that are in overlapping relation, as opposed to a number of documents that may be related, but which are conveyed serially to the image entry feeder.

When processing packets, the image entry feeder 110 separates and serially feeds each document in a packet to the imaging station 210. The image entry feeder 110 includes a pre-feeder assembly 120 and a feeder 160. The pre-feeder assembly 120 is configured to prepare packets for entry into the feeder 160, thereby reducing the likelihood of a jam occurring as a packet enters or is processed by the feeder.

The pre-feeder assembly 120 comprises a pair of pre-feeders: a first pre-feeder assembly 122, which the documents first engage when they enter the pre-feeder assembly from the drop conveyor 100, and a second pre-feeder 124 configured similar to the first pre-feeder. The second pre-feeder 124 receives the documents from the first pre-feeder 122 and feeds the documents to the feeder 160.

Figure 2:
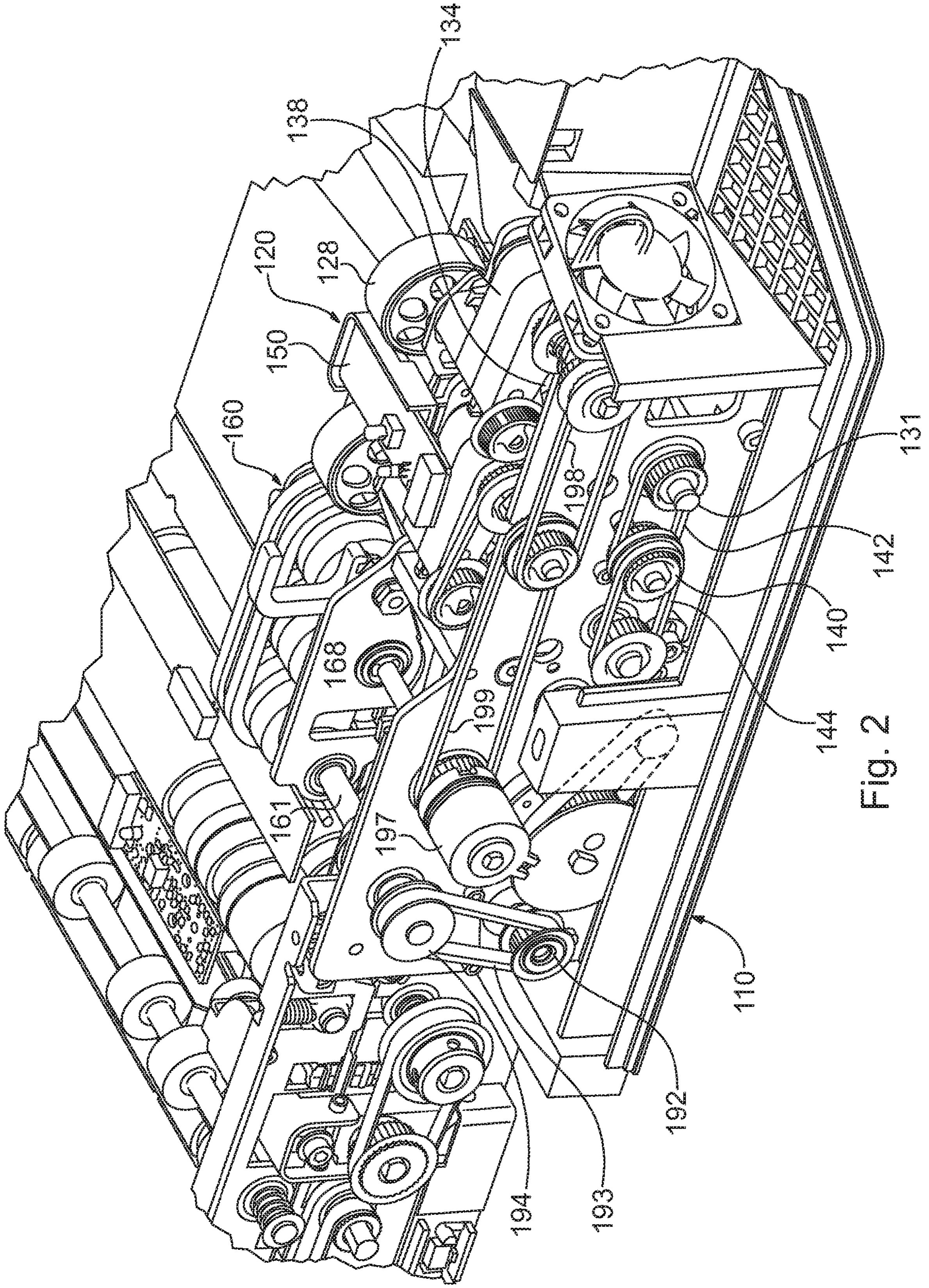
FIG. 2 is an enlarged fragmentary perspective view of a portion of the document processing system of FIG. 1, illustrating features of an image entry feeder module.
Figure 3:
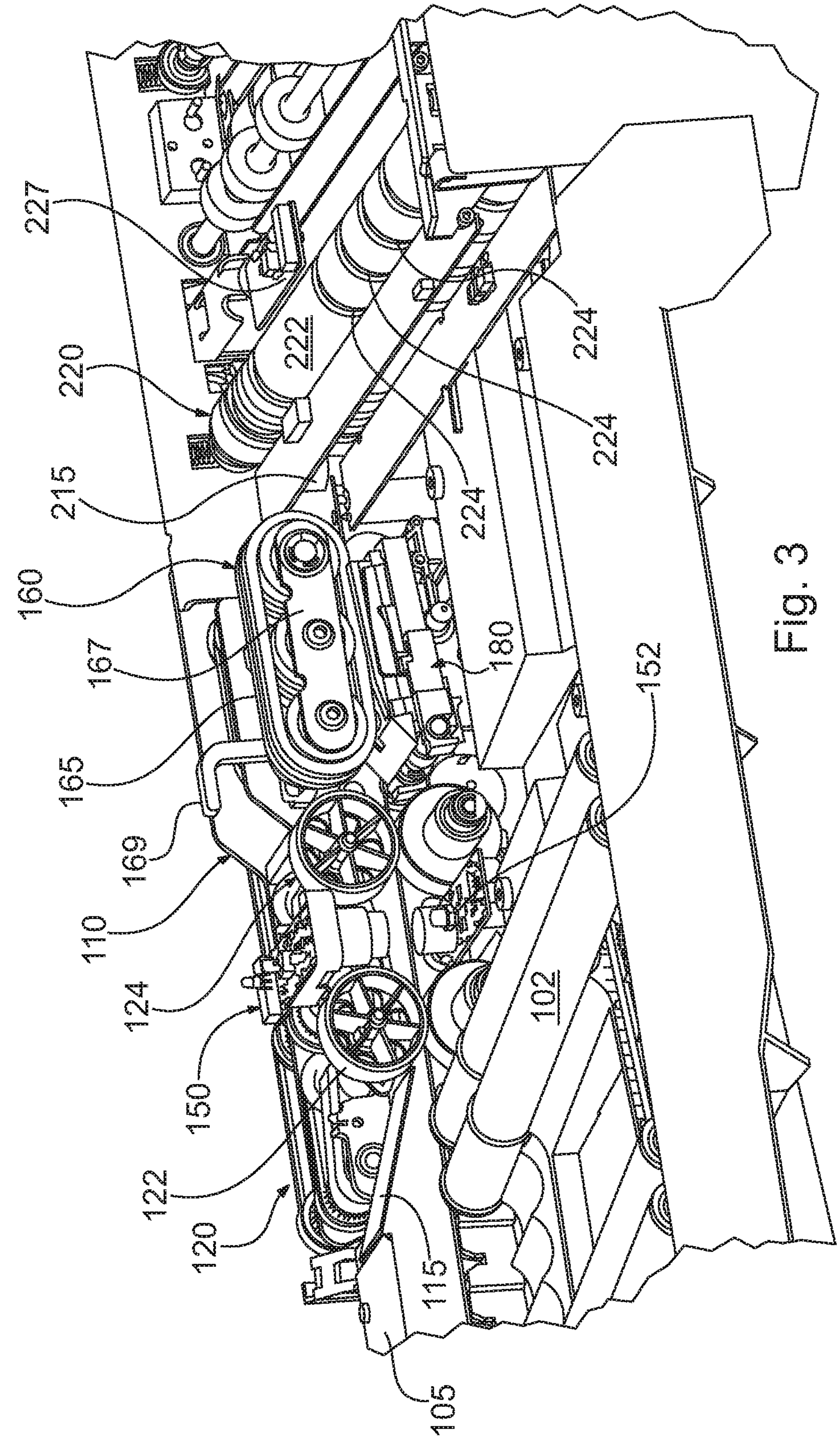
FIG. 3 is a rear fragmentary perspective view of the image entry feeder module illustrated in FIG. 2.
Figure 5:
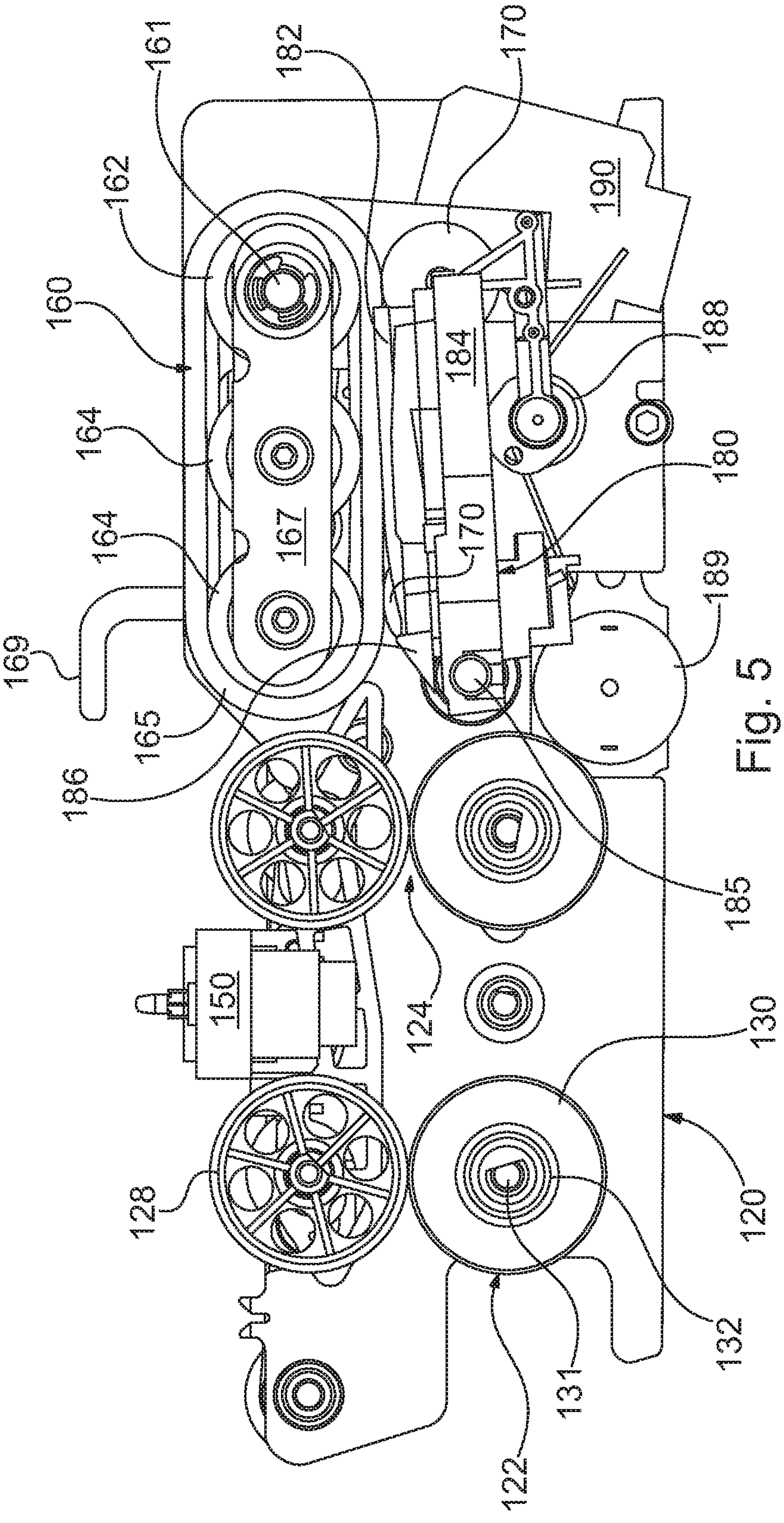
FIG. 5 is an enlarged fragmentary rearward view of the image entry feeder module of FIG. 2.

Referring to FIGS. 2,3 and 5, the first pre-feeder assembly 122 includes a pair of opposing rollers 128 and 130 that form a nip. An angled guide 115 at the end of the justification rail 105 overhangs the conveyor 100 and directs the documents downwardly toward the nip of the first pre-feeder assembly 122. More specifically, for folded documents that were unfolded but remained creased, or documents that are otherwise not flat, an upper edge of the documents tends to be spaced up off of the surface of the drop conveyor. The justification rail 105 has a lip overhanging the drop conveyor 100, so that this upper edge of the documents tends to be displaced under the lip of the justification rail as the conveyor tends to move the documents toward the justification rail. The angled guide 115 interacts with the justification rail, so that the upper edge of the folded documents is flattened downwardly toward the conveyor so that the leading edge of the document can enter the nip of the first pre-feeder assembly rather than folding over.

As mentioned above, the first pre-feeder assembly includes an upper roller 128 and a lower roller 130. The upper roller 128 is a drive roller, and the lower roller 130 is a driven roller. The upper roller 128 is mounted on a pivoting arm 134 that pivots about a pivot shaft 135. A biasing element biases the pivot shaft to urge the upper roller 128 toward the lower roller 130. As documents enter the first pre-feeder assembly 122, the roller and pivoting arm pivot away from the lower roller against the bias of the biasing element to form a gap large enough to accommodate the document or packet of documents entering the first pre-feeder assembly. As the trailing end of the document or packet of documents exits the first pre-feeder assembly 122, the upper roller 128 pivots into engagement with the driven roller 130 until the subsequent document or packet enters the first pre-feeder assembly.

As discussed further below, it may be desirable to incorporate a thickness detector 138 into the first pre-feeder assembly 122. The thickness detector may be any of a variety of sensors, such as an LVDT sensor or RVIT sensor. However, preferably the thickness sensor 138 is a Hall effect sensor. The Hall effect sensor includes a sensor board disposed adjacent a magnet that is mounted on the pivot arm 134 that biases the magnet toward the sensor. The magnetic field created by the magnet is measured by the sensor board as a function of the distance between the magnet and sensor. When a document or packet enters the thickness detector 138, the pivot arm 134 is forced apart, thereby separating the magnet and the sensor board accordingly, changing the magnetic field intensity, thereby indicating the thickness of the document(s) in the first pre-feed assembly.

The lower roller 130 of the first pre-feeder 122 is rotatably mounted on a fixed shaft and may operate simply as an idler roller. In the present instance, the lower roller is coupled to the fixed shaft via a torque limiting device 132. A variety of torque limiting devices can be utilized, and in the present instance, the lower roller is connected with the shaft via a magnetic torque limiter, the operation of the torque limiting element will be described further below in greater detail.

From the first pre-feeder assembly 122, the documents enter the second pre-feeder assembly 124. The structure of the second pre-feeder assembly is substantially similar to the first pre-feeder assembly, including a pivoting upper roller forming a nip with a lower roller mounted on a fixed shaft via a torque limiting element. However, in the present instance, the second pre-feeder assembly 124 does not include a thickness detector for detecting the displacement of the pivoting arm on which the upper roller is mounted, as may be incorporated in the first pre-feed assembly 122, as discussed above.

As shown in FIG. 3, a thickness detector 150 is positioned between the first pre-feeder assembly 122 and the second pre-feeder assembly 124. The thickness detector is operable to provide indicia of the number of documents being conveyed from the first pre-feeder assembly 122 to the second pre-feeder assembly. In one manner, the thickness detector may determine the thickness of the document or packet of documents and then estimates the number of documents based on the assumed thickness for an individual document. However, in the present instance, the thickness detector 150 does not directly measure the thickness of the document or packet. Instead, the thickness detector 150 is an ultrasonic detector that uses ultrasound waves emitted from a transmitter and received by a receiver. Based on the signals received by the receiver, the number of transitions between sheets of papers can be determined to evaluate how many documents are in a stack.

In addition to the thickness detector, a pre-feed sensor 152 is also provided, which senses the leading edge of a document or packet as the document or packet is conveyed through the pre-feeder assembly 120. The pre-feed sensor 152 may be any of a variety of sensors, and the functionality of the pre-feed sensor may be combined with the functionality of the thickness detector 150. However, in the present instance, the pre-feed sensor 152 is a separate sensor in the form of an infrared transmitter and receiver disposed between the first pre-feed assembly and the second pre-feed assembly. More specifically, the pre-feed sensor 152 is mounted on the circuit board on which the ultra-sound detector 150 is mounted, which is disposed between the first pre-feed assembly 122 and the second pre-feed assembly 124.

From the second pre-feeder assembly 124, the documents enter the feeder 160. If a packet of documents is fed through the pre-feeder assembly 120, the feeder operates to singulate the documents in the packet so that each document is serially fed into the imaging station 210. If instead of a packet, a single document is fed through the pre-feeder assembly 120, the single document simply passes through the pre-feeder and is fed by the feeder 160 to the imaging station 210.

The feeder 160 includes a plurality of feedbelts 165 spaced apart from one another across the width of the image entry feeder module 110. Although a single wide belt could be used, in the present instance, the feeder incorporates parallel belts mounted about a plurality of rollers. Specifically, in the present instance, the feeder 160 includes a drive roller 162 mounted on a drive shaft 161. The feedbelts 165 are also entrained about a pair of driven rollers 164 as shown in FIG. 5. The rollers 162, 164 are rotatably mounted between a pair of mounting brackets 167, 168. The front mounting bracket 167 is a flat arm as shown in FIG. 5, however, the rear mounting bracket 168 includes an attached lifting arm for pivoting the feeder as discussed further below.

Figure 4:
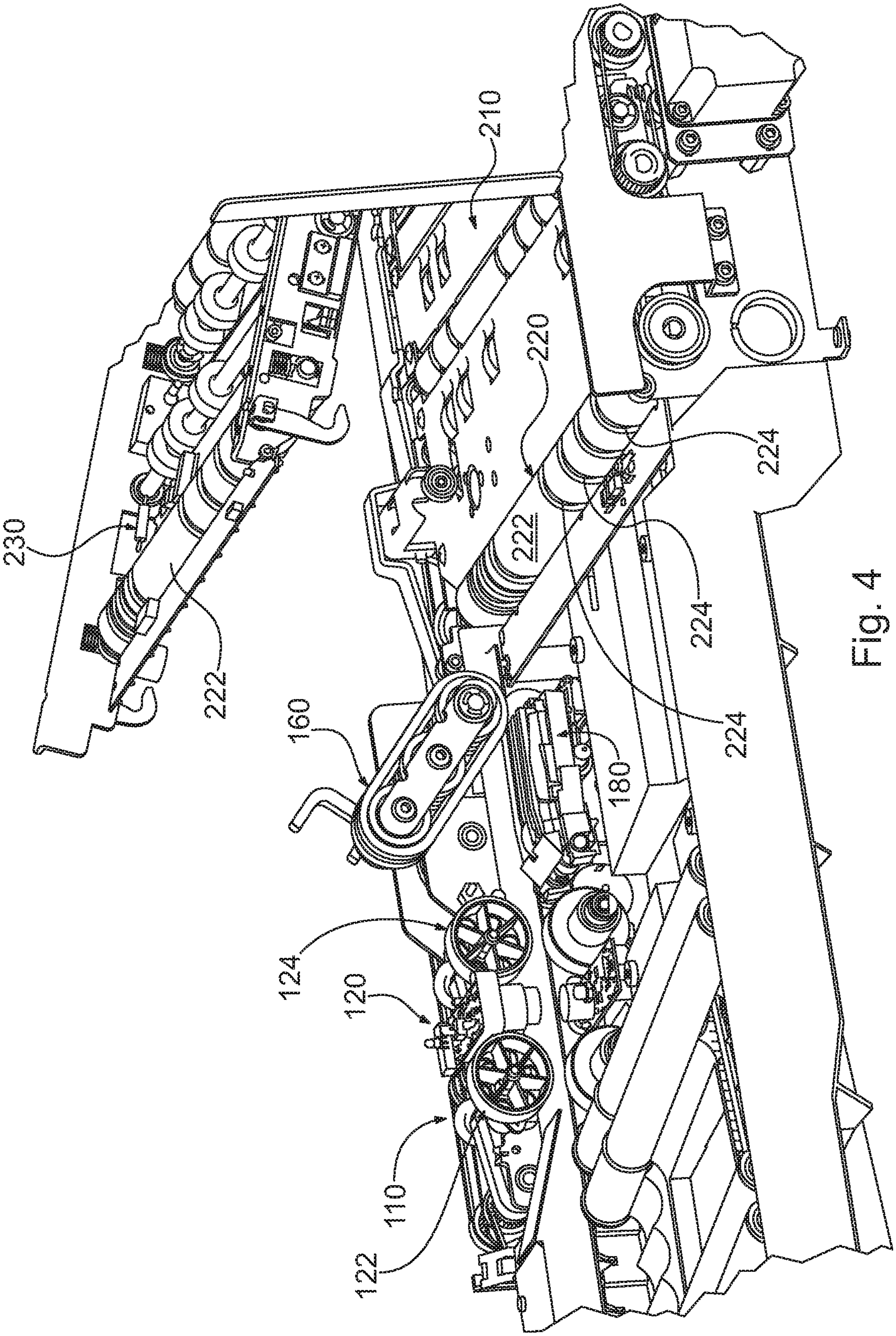
FIG. 4 is a rear fragmentary perspective view of the image entry feeder module illustrated in FIG. 3, showing a feeder of the image entry feeder module pivoted upwardly.

The feeder 160 is driven by drive shaft 161 and is also pivotable about the drive shaft. For instance, in FIG. 3 the feeder 160 is pivoted downwardly into an operation position in which the feeder can feed documents. In FIG. 4, the feeder 160 is pivoted upwardly to allow removal of documents that may be jammed in the feeder.

A retard mechanism 180 is disposed opposing the feeder 160 to selectively impede the entrance of documents into the feeder 160. Additionally, a nip is formed between the feeder 160 and a pair of spring-mounted idler rollers 170 that are biased toward the feeder. In this way, documents entering the feeder pass between the spring-mounted idler rollers 170 and the feed belt.

Figure 8:
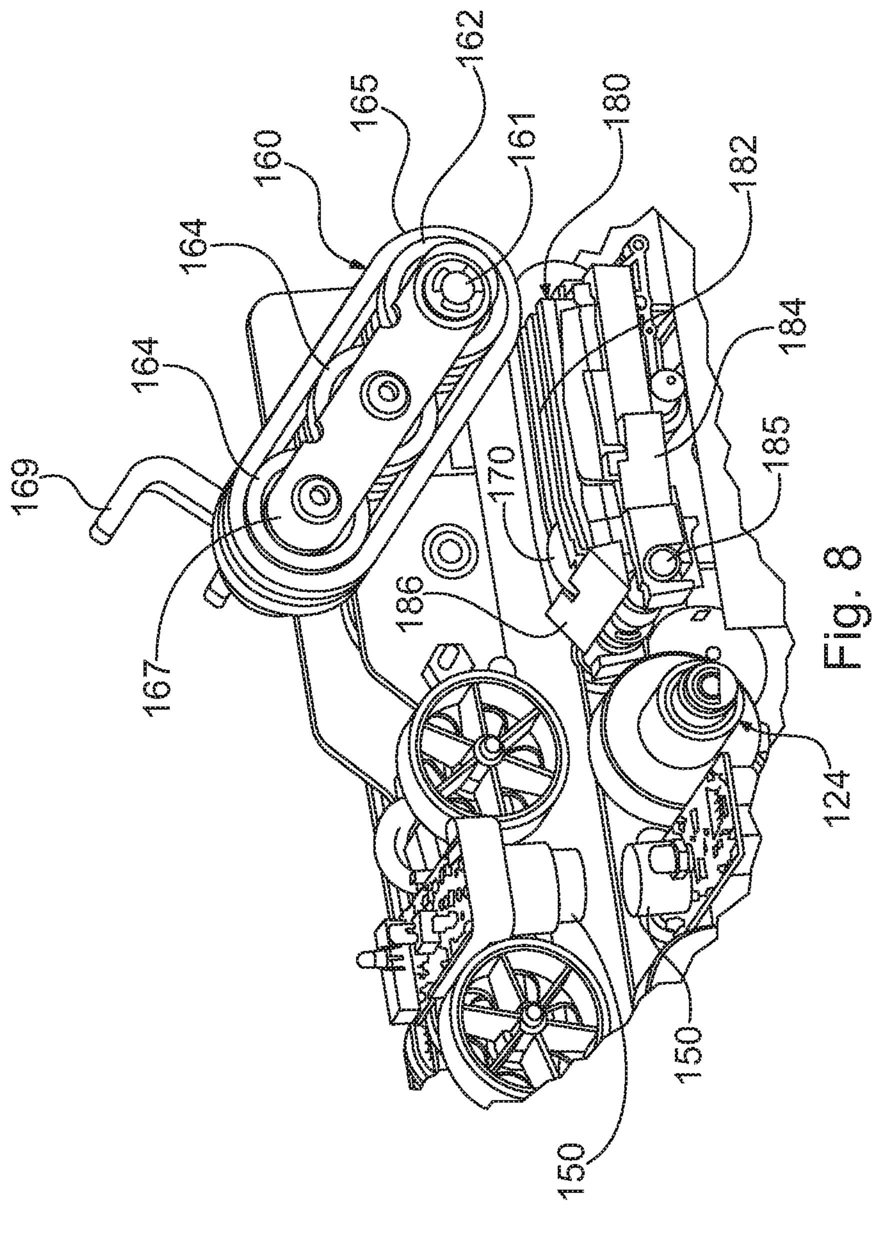
FIG. 8 is an enlarged fragmentary perspective view of a portion of the image entry feeder module illustrated in FIG. 4, showing enlarged features of the retard assembly.

The retard mechanism 180 selectively cooperates with the feed belts 165 to separate the documents in a packet. Referring to FIG. 8, the details of the retard assembly are enlarged. An angled ramp guides documents exiting the nip of the second pre-feeder assembly 124 and directs the documents toward the area between the feeder belts 165 and the retard assembly 180. The retard mechanism 180 includes a high friction retard pad 182 so that the frictional force between a document and the retard pad is greater than the frictional force between two documents. The retard pad can be formed in any of a number of configurations. However, in the present instance, preferably the retard pad has a plurality of spaced apart ridges that are disposed between the belts that form the feeder. The retard pad 182 is mounted on a mounting frame 184 and the upstream end of the frame 184 is pivotable about pivot shaft 185.

The retard mechanism 180 selectively cooperates with the feed belts 165 to separate the documents in a packet. Referring to FIG. 8, the details of the retard assembly are enlarged. An angled ramp guides documents exiting the nip of the second pre-feeder assembly 124 and directs the documents toward the area between the feeder belts 165 and the retard assembly 180. The retard mechanism 180 includes a high friction retard pad 182 mounted on a mounting frame 184. The upstream end of the frame 184 is pivotable about pivot shaft 185.

The frame 184 pivots between an upper position (see FIG. 5) in which the retard pad 182 is adjacent to or in contact with the feed belts 165, and a lower position (see FIG. 6) in which the retard pad is displaced away from the feed belts to create a distinct gap between the retard pad and the feed belts. A rotatable cam 188 operatively linked with the mounting frame 184 of the retard 180 is operable to displace the mounting frame, and therefore, the retard pad, between the upper and lower positions. The operation of the retard assembly 180 will be described below in greater detail.

Figure 7:
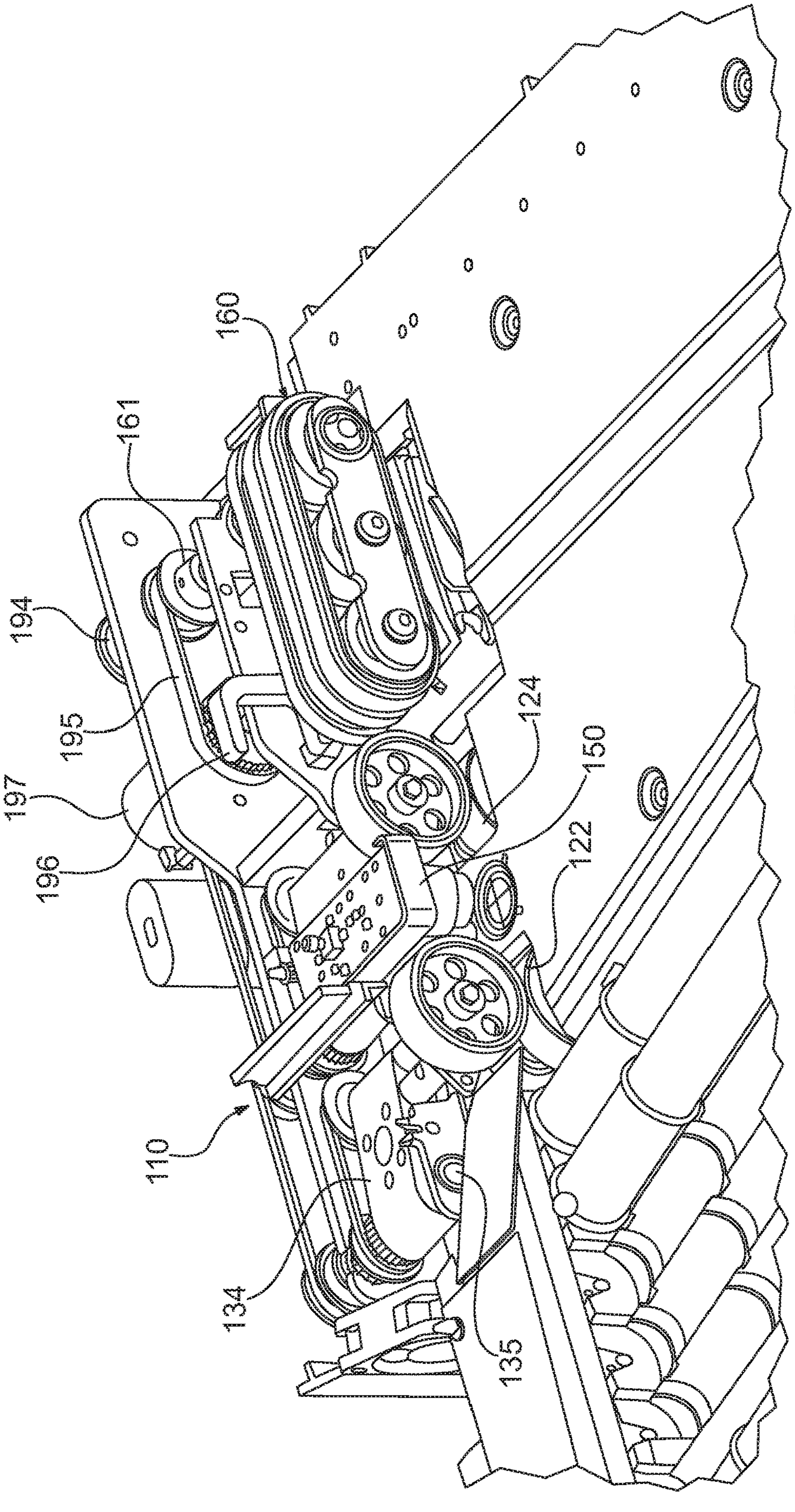
FIG. 7 is an enlarged perspective view of the image entry feeder module of FIG. 3 including a cover on which the documents are supported as the documents pass through the image entry feeder module.

Referring to FIGS. 2-3, 5 and 7, the drive control of the image entry feeder 110 will be described in greater detail. A drive motor 190 (see FIG. 5) drives the image entry feeder module 110. As shown in FIG. 2, the motor 190 is connected with a drive pulley 192. The drive pulley 192 is interconnected with a feed belt drive pulley 194 by a drive belt. The feed belt pulley 192 drives the drive shaft 161 of the feeder 160. Additionally, as shown in FIG. 7, the transfer belt 195 interconnected with the drive shaft 161 drives transfer pulley 196. Transfer pulley 196 drives the shaft that drives pre-feed drive pulley 197, which in turn drives second pre-feed belt 199 and first pre-feed belt 198. The first pre-feed belt 198 drives the driven roller of first pre-feed assembly 122. Similarly, the second pre-feed belt 199 drives the driven roller of the second pre-feed assembly.

Referring still to FIG. 2, a braking mechanism 140 is illustrated. The braking mechanism 140 is operable to brake the first and second pre-feeed assemblies 122, 124. Specifically, brake 140 is interconnected with the lower roller of the first pre-feed assembly 122 via gears. Similarly, brake 140 is interconnected with the lower roller of the second pre-feed assembly 124 via gears. In this way, when the brake 140 is actuated, the gears transmit a braking force to the lower rollers 130 of the pre-feed assemblies 122, 124.

Referring to FIGS. 2 and 5 the drive mechanism for the retard cam 188 is illustrated. The drive mechanism includes a dc motor 189 (see FIG. 5), which drives a drive belt 191 via a pulley (see FIG. 2). The belt 191 drives the rotatable shaft onto which the cam 188 is mounted, as shown in FIG. 5.

In the foregoing description, the drive mechanisms between the motors 189, 190 include a plurality of belts and pulleys. Although a variety of belts and pulleys can be used to transmit power between the motors 189, 190 and the various elements, in the present instance, the belts are timing belts and the pulleys are timing pulleys, as illustrated in the Figures. Additionally, it may be desirable to utilize different drive elements to transfer the power from the motors to the driven elements. For instance, rather than drive belts, the system may utilize a series of gears to interconnect the motors with the driven elements.

In addition to the elements described above, the flow of documents through the image entry feeder module 110 may also be controlled based on signals received from sensors in the imaging station 210. For instance, referring to FIGS. 3-4, the imaging station 210 includes a feeder exit sensor 215 positioned downstream from the feeder 160, but upstream of crusher rollers 220 that engage the documents to control the transport of the documents through the imaging station 210. The feeder exit sensor 215 may be any of a variety of sensors that are operable to detect the leading and/or trailing edge of a document. In the present instance, the image entry sensor 215 is an infrared transmitter/receiver sensor.

Additionally, the imaging station 210 may include a sensor 227 that detects the leading edge of documents downstream from the crusher roller prior to the documents entering the imager. At this point, the documents are entrained by the crusher roller 220 and no longer controlled by the image entry feeder module 110. The sensor 227 may also be operable to detect the thickness profile of a document. The thickness profile can then be evaluated to determine a characteristic about the document. For instance, the profile for two documents as detected by the ultrasound sensor 150 is similar to the profile for an envelope. However, the thickness profile for an envelope has characteristics that distinguish the envelope from two sheets of paper due to the changes in thickness over the length of the envelope resulting from the seams of the envelope.

Configured as described above, the image entry feeder module 110 operates as follows. The drop conveyor 100 conveys one or more documents to the image entry feeder module 110 to feed the document(s) to the imaging station 210. If the document(s) is creased or otherwise sticking up from the drop transport 100, the entry guide 115 deflects the document(s) toward the first pre-feed assembly 124. The document(s) enter the nip between the drive roller 128 and the driven roller 130. As the documents enter the nip, the drive roller or upper roller 128 is displaced away from the lower driven roller 130 to provide clearance of the document (s). The thickness detector 138 detects the displacement of the pivot arm 134 as the upper roller moves away when the documents enter the nip of the first pre-feed assembly. Alternatively, rather than thickness detector 138, a signal from ultrasonic detector 150 indicative of a thick packet of documents may be used. The signal from the thickness detector or ultrasonic detector is communicated with the central controller, and if the thickness detected exceeds a predetermined threshold, then the packet is considered a thick packet, and the drop conveyor 100 is stopped until the thick packet has been fed to the imaging station by the image entry feeder module 110. Specifically, the system does not advance documents into the first pre-feed assembly 122 until the document(s) being fed from the second pre-feed assembly 124 to the feeder 160 are finished being fed. For instance, if the feeder 160 is feeding a packet of five documents to the imaging station 210, it is desirable to maintain the grouping of the packet, without mixing the documents in the packet with other documents. Therefore, no further documents are advanced into the second prefeed assembly while that feeder 160 is finishing singulating the documents in the packet. Once the final document in a packet clears the second pre-feed assembly, the system sends a signal to the document transport to advance the next document or packet of documents from the drop feeder to the pre-feed assembly 120.

Figure 6:
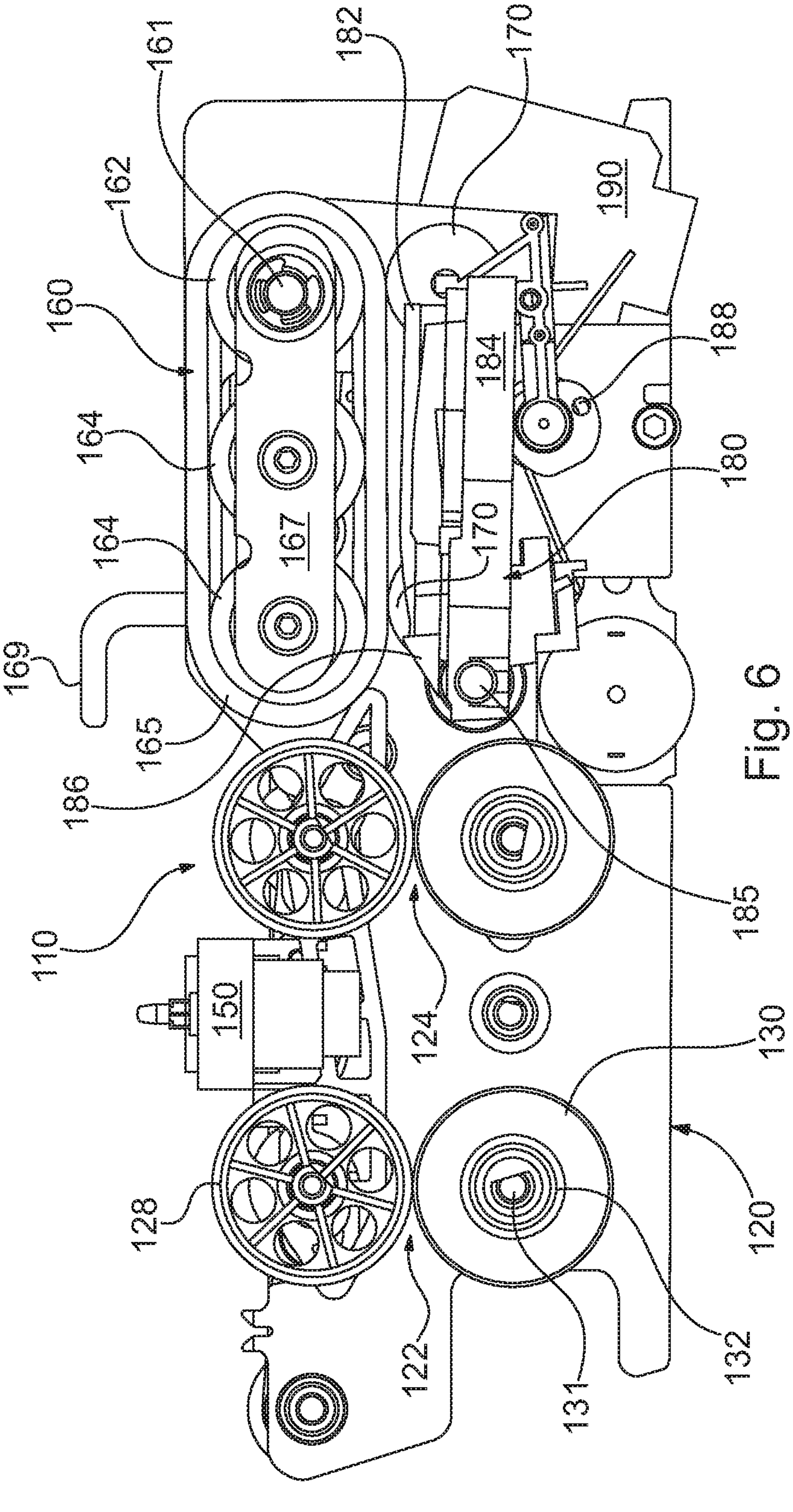
FIG. 6 is an enlarged fragmentary rearward view of the image entry feeder module of FIG. 5, showing a retard assembly pivoted away from the feeder.

The image entry feeder 110 module processes single document differently than a packet. Specifically, as the single document passes the ultrasonic thickness detector 150, the detector determines whether the transaction is a single document or a packet. If the detector 150 determines that the transaction is a single document, the document continues through the second pre-feed roller without stopping. In response to the signal from the ultrasonic detector that the document is a single document, the retard assembly 180 is activated to pivot the singulator away from the feed belts 165. Specifically, when a single document is detected by the ultrasonic detector, the controller 116 actuates the cam drive motor 189, which drives cam drive belt 191, which in turn rotates the retard pad 182 away form the feed belts 165 to create a gap as shown in FIG. 6. The second pre-feeder 124 drives the single document into the nip between the spring mounted idler rollers 170 and the feed belts 165. In other words, the spring mounted idler rollers provide a nipping surface with the drive belts regardless of whether the retard pad is pivoted upwardly toward the feed belts 165 or down as shown in FIG. 6. Since the retard pad is pivoted downwardly, the single document passes through the feeder 160 without engaging the retard, thereby reducing wear on the retard pad.

In contrast to the example of a single document, when a packet of documents is fed to the pre-feeders, the ultrasound detector 150 detects a transaction profile that is indicative of a packet rather than an individual document. In response to a signal from the system that the transaction is a packet, the brake 140 is energized. Specifically, once the transaction is determined to be a packet, the brake is energized a predetermined time delay after the time that leading edge of the packet is detected by the pre-feed sensor 152. However, it may be desirable to energize the brake for each transaction regardless of the whether the transaction is a single document or multiple documents.

The timing of braking is independent from the timing of the determination that the transaction is a packet. In other words, the timing of the brake is not measured from the time that the system determines that the transaction is a packet. In fact, in typical operation, the pre-feed sensor 152 will detect the leading edge of a transaction before the system determines whether or not the transaction is a packet in response to the signals from the ultrasound detector 150. Nonetheless, once the determination is made, the timing of the brake actuation is measured from the time that the leading edge passed the pre-feed sensor.

Since the brake is connected to the drive shafts for the lower rollers of pre-feeders 122, 124, actuating the brake 140 impedes the displacement of the lower rollers 130 of the pre-feeders 122, 124. By braking the lower rollers and continuing to drive the upper rollers to drive the packet forward, the top documents in the pack are shifted forwardly relative to the lower documents. In this way, the upper rollers tends to shift the documents in the packet forwardly relative to the bottom documents, causing the packet to shingle so that the leading edge of the top document overhangs the lead edge of the second document in the packet, which overhangs the lead edge of the third document in the packet, and so on, down to the bottom document in the packet. Shifting the top document(s) forwardly facilitates improved singulation of the packet relative to a packet in which the top document in a packet is disposed rearwardly of the documents below in the packet.

As described above, once the system determines that a transaction is a packet and the brake 140 is actuated, the pre-feeders start to shingle the documents, which facilitates feeding of the documents to the feeder. Once the system determines that the transaction is a packet, if the retard assembly 180 is in the downward position in which the retard pad 182 is displaced away from the feed rollers, the system actuates the cam drive motor 189, which rotates the cam 188, thereby driving the retard pad 182 toward the feeder belts 165 to form a nip between the retard and the feeder belts.

As the pre-feed assemblies 122, 124 drive the packet forwardly, the first document in the packet enters the nip between the feeder belts 165 and the retard pad 182, and the nip between the feeder belts 165 and the spring-loaded idler wheels 170. The feeder belts 165 have a higher coefficient of friction than the retard pad, so that the top document in the packet is engaged and driven through the feeder 160 while the rest of the documents in the packet are held back by the retard.

Once the top document in a packet enters the feeder 160, the feeder belts 165 drive the document through the feeder toward the imaging station 210. In this way, the feeder separates the lead document from the remaining documents in the packet, thereby singulating the document. As the leading edge of the document leaves the feeder 160, the feeder exit sensor 215 senses the leading edge of the document. In response, the pre-feed clutch 197 may disengage the driving force transmitted to the upper pre-feed rollers via the pre-feed drive belts 198, 199. Disengaging the pre-feed upper rollers, reduces the tendency of the rollers to buckle the documents, which can occur in response to driving the packet forward toward the feeder while the retard holds the documents back.

After the lead document passes the feeder exit sensor 215, the leading edge of the document enters the nip formed between the crusher rollers 220. The crusher rollers 220 positively entrain the document and have greater frictional control over the document than the frictional force between the feeder 160 and the document. Therefore, the feeder 160 does not need to drive the document forwardly in order to continue to advance the document. Accordingly, once the leading edge of the document is detected by the sensor downstream from the crusher rollers 220, such as the thickness detector 227 (or a separate sensor detector similar to the feeder exit sensor 215), it is known that the document is entrained by and therefore controlled by the crusher rollers. Therefore, to reduce the likelihood of the feeder 160 feeding the second document in the packet before the first document is completely fed (commonly referred to as a double-feed), the controller may turn off the drive motor 190, thereby stopping the feeder 160. Despite the fact that the feeder is stopped, the crusher rollers 210 entrain the document with sufficient frictional force that the crusher rollers drive the document forwardly, pulling it out of the feeder. A one-way overrun clutch allows the belt roller to spin while the feeder motor is stopped while the crusher rollers pull the document out. Once the feeder exit sensor 215 senses the trailing edge of the document, the controller then actuates the drive motor 190 to re-start the feeder to feed the next document in the packet in the same way that the previous document was fed. Additionally, the clutch 197 is actuated to re-connect the pre-feed drive belts 198, 199 with the motor 190, so that the upper rollers of the pre-feed assemblies 122, 124 urge the packet toward the feeder 160.

As discussed above, once the system determines that a transaction is a packet, the brake 140 is actuated to brake the lower pulleys of the pre-feeder assemblies 122, 124. However, the motor 190 continues to drive the upper pulleys of the pre-feed assemblies, thereby driving the documents toward the feeder. The rollers of the pre-feed assemblies 122, 124 are high friction rollers, so that the lower roller tends to hold back the lower document in a packet. Further, as mentioned above, the lower rollers of the pre-feed assemblies 122, 124 are mounted on fixed shafts 131 via torque limiters 132. The torque limiters are set so that the frictional force between the upper roller and the lower roller is sufficient to overcome the limit on the torque limiter so that when there is no document in the pre-feeder, the frictional force of the driven upper wheel drives the lower wheel forwardly even if the brake is applied. Similarly, the torque limiter is set so that the frictional force between the lower roller 128 in the pre-feeder 122 and a single sheet of paper is sufficient to overcome the limit of the torque limiter so that when there is a single document in the pre-feed assembly, the frictional force of the driven wheel against the single sheet of paper, which in turn engages the lower wheel, drives the lower wheel forwardly even if the brake is applied. Although the limits for the torque limiters 132 are set so that the upper rollers overcome the limits on the torque limiters if there is either no document in the pre-feeders 122, 124 or only a single sheet, the limit on the torque limiters is set so that the a paper to paper interface is not sufficient to overcome the torque limiter. In this way, if two or more documents are nipped in the pre-feed assemblies, the frictional force applied to the braked lower rollers by the driven upper rollers through the two documents is insufficient to overcome the limit of the torque limiters, so that the lower rollers remain braked.

With the torque limiters 132 set as discussed above, the pre-feed rollers 122, 124 control the advance of the documents in a packet, shingling the packet forwardly, while allowing the first and last documents in a packet to be readily fed through the pre-feed assemblies 122, 124 even while the brake 140 is applied.

Although the foregoing description provides details of a clutching mechanism for selectively controlling the actuation of driving force from the motor 190 to the pre-feed assemblies, in the present instance, the clutch 197 is eliminated so that the top rollers of the pre-feed assemblies continue to drive the documents in the pre-feeder forwardly even when the packet is being held back at the feeder by the retard assembly 180.

Imaging Station

From the image entry feeder module 110, the documents serially enter a nip formed between a pair of crusher rollers 220. Although the entry feeder holds the documents down, it does not flatten the documents; it generally just holds an edge of the document flat against the base plate of the feeder. In contrast, the crusher attempts to flatten the creased documents.

The crusher rollers 220 are elongated cylindrical aluminum rollers 222 having a smooth surface. A plurality of elastomeric gripping rings 224 are formed around the circumference of the roller 222 and spaced apart from one another. Preferably, a first gripping ring is positioned at the end of the roller 224 closest to the entry feeder 110, and a second gripping ring is positioned on the roller a couple inches away. More specifically, preferably the second gripping ring is spaced inwardly less than the width of the feeder 110. In addition, preferably a third gripping ring is positioned adjacent the opposite end of the roller. The first and second gripping rings 224 provide nips that drive the paper from the entry feeder to the imager 230. The third gripping rings are positioned so that they are not in the paper path (i.e. the third gripping rings do not engage the documents. Instead, the third gripping rings provide spacing to maintain the rollers parallel with a constant gap.

Preferably, the first two gripping rings 224 on the rollers 222 are positioned so that both rollers engage a single fold for documents that are tri-folded with the fold lines disposed parallel to the paper path. In this way, the gripping rings engage the edge-justified third of the tri-folded document, while the rest of the document can slide across the width of the crusher roller since the remaining width of the crusher roller in the paper path is aluminum. In this way, the crusher roller flattens the documents without buckling the documents.

A plurality of feeder exit sensors 215 are disposed in the feeder between the image entry feeder module 110 and the crusher roller 220. After passing the feeder exit sensors 215 and the crusher roller 220, the document passes through a thickness detector 227 that measures the document at a plurality of points along the length of the document. In the present instance, the thickness detector 227 is Hall effect-type of sensor, similar to the optional thickness detector 138 described above in connection with the first pre-feed assembly 122.

From the thickness detector 227, the document enters the imager 230. Preferably the imager comprises a pair of scanners for scanning both sides of the document. Specifically, preferably the imager 230 includes a lower plate in which the lower scanner 230 is located, and an upper plate in which the upper scanner is located. The lower scanner 230 scans the bottom face of the document, and the upper scanner scans the upper face of the document. As shown in FIG. 4 preferably the upper plate of the scanner is pivotable upwardly away from the lower plate to allow access into the imaging station 210 in the event of a jam in the imaging station.

Although the scanners may be black and white or gray scale, preferably, the scanners 230 are color scanners. More specifically, preferably the scanners 230 are contact image sensor (CIS) modules formed of arrays of photodiodes that operate as scanning elements, and LED light sources.

As the document passes between the scanners, the scanners scan the faces of the document to obtain image data representing a color image of the document faces. The image is communicated with the system computer and the image data is stored in a data file associated with the document.

From the scanner, the document is conveyed to a MICR detector, which attempts to read any MICR markings on the document. Specifically, MICR markings are printed in magnetizable ink. The MICR detector includes a magnet that exposes the document to a magnetic field. The MICR detector also includes a MICR reader that scans the document for magnetic fluctuations indicative of MICR characters. If the apparatus detects the presence of a MICR line, the MICR detector attempts to read the MICR line. The data representing the MICR information is then communicated with the system computer, which stores the MICR data in a data file associated with the document.

Imaging Transport

The imaging transport extends between the imaging station 210 and the sorting station 240. Preferably the imaging transport is formed of two halves, and the upper half is pivotable away from the lower half to provide access to the transport path to remove any paper jam in the transport, or perform service on the interior element, as shown in FIG. 4.

As shown in FIG. 1, the document path between the imaging station 210 and the sorting station 240 is preferably not a straight horizontal path. Instead, preferably, the imaging transport turns upwardly and curves backwardly toward the seating area 15. Between the imaging station 210 and the sorting station 240, an optional uncreasing station and a printer may be disposed along the transport path. The uncreasing station is a guide having a sharp edge that the documents pass over as the documents turn along the transport path. If included, the printer is disposed along the transport so that the printer can print markings on the documents as they are conveyed to the sorting station 240.

The printer includes at least one ink jet printer. The printer is disposed behind covers in the imaging transport. More specifically, a first printer is preferably disposed behind a plate in the upper portion and preferably the second printer is disposed behind a plate in the lower portion. In response to signals from the computer, the printer(s) prints audit trail data onto each document. The audit trail information printed on a document includes data particular to the document, such as the document type for each document, the batch number for the document, the document number, the transaction number for the transaction of which the document is a member, and the date on which the document was processed. The audit trail information can be used to subsequently locate a particular document within a stack of documents.

Sorting Station

The sorting station 240 is disposed at the end of the imaging transport, and the sorting station includes a plurality of gates operable to sort the documents into one of a plurality of bins 245. The sorting station includes a plurality of gates that are operable to direct the documents to the appropriate bin 245. The sorting can be based on a number of criteria. For instance, the documents can be sorted according to information determined from the image data.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

The invention claimed is:

1. An apparatus for processing groups of documents each document having upper and lower faces and edges, the documents of each respective group to be processed being stacked in overlapping relation with the lower faces of the documents facing downward to form a corresponding packet and, comprising:

a horizontal transport defining a surface dimensioned and arranged to receive each respective group of documents dropped thereon from above and support the bottom face of a lowermost document of the corresponding packet, the surface of the horizontal transport being oriented and configured to convey the corresponding packet in a direction of travel and to maintain the documents of the corresponding packet in overlapping relation one atop another as the corresponding packet is conveyed, a feeder operable to receive the corresponding packet from the horizontal transport and to separate the documents of the corresponding packet to serially feed the documents away from the feeder, and to maintain respective lower faces of the separated documents in a generally horizontal orientation in preparation for scanning;

an imaging station configured to receive the documents from the feeder and scan the documents to obtain image data for the documents;

a sensor for detecting a characteristic indicative of distinguishing a packet of two or more documents from a thick packet of documents having a number of documents that exceeds a predetermined threshold; and a controller configured to control operation of the generally horizontal transport in response to signals received from the sensor;

wherein in response to the sensor detecting a characteristic indicative of the packet being a thick packet thicker than the packet of two or more documents, the controller controls the horizontal transport to reduce the speed of the horizontal transport.

2. The apparatus of claim 1 wherein the sensor is positioned between the feeder and the horizontal transport.

3. The apparatus of claim 1 comprising a pre-singulator disposed between the horizontal transport and the feeder, wherein the pre-singulator comprises an upper roller and a lower roller forming a nip for receiving the documents from the horizontal transport in a horizontal orientation.

4. The apparatus of claim 3, wherein in response to receiving a signal from the sensor indicative of the corresponding packet exceeding the threshold, the controller is configured to control the horizontal transport to impede displacement of a subsequent corresponding packet into the pre-singulator.

5. The apparatus of claim 1, wherein the horizontal transport comprises a plurality of rollers configured to engage the lower faces of the documents in a generally horizontal orientation.

6. The apparatus of claim 1 comprising a sorter for receiving the documents from the imaging station and sorting the documents into a plurality of output locations.

7. The apparatus of claim 1, wherein the horizontal conveyor is configured to displace the corresponding packet horizontally toward a justification element configured to justify an edge of the corresponding packet.

8. The apparatus of claim 1, wherein the threshold is greater than two documents.

9. A method for processing groups of documents, each document having upper and lower faces and edges, the documents of each respective group to be processed being stacked in overlapping relation with the lower faces of the documents facing downward to form a corresponding packet, comprising the steps of:

dropping the corresponding packet of documents onto a horizontal conveyor from above with the lower faces of the documents in the packet in a generally horizontal orientation;

conveying the corresponding packet of documents along the horizontal conveyor toward a feeder with the lower faces of the documents in the corresponding packet in a horizontal orientation;

detecting a characteristic of the documents in the corresponding packet indicative of whether the number of documents in the corresponding packet exceeds a threshold while the documents are in a horizontal orientation;

separating the documents in the corresponding packet after the step of detecting and serially feeding the documents away from the feeder;

scanning the documents after the step of separating wherein the step of scanning comprises receiving the documents from the feeder and scanning the documents to obtain optical image data for the documents; and controlling the speed of the horizontal conveyor in response to the step of detecting.

10. The method of claim 9, wherein the step of controlling the speed comprises reducing the speed of the horizontal conveyor in response to detecting the characteristic indicative of the number of documents in the corresponding packet exceeding the threshold.

11. The method of claim 9, wherein the step of detecting is between the step of conveying and feeding.

12. The method of claim 9, wherein the step of conveying comprises conveying the corresponding packet of documents while the lower faces of the documents in the corresponding packet are in a substantially horizontal orientation.

13. The method of claim 9, wherein the step of dropping comprises dropping the documents onto a horizontal roller bed.

14. The method of claim 9, wherein the step of conveying comprises the step of conveying the documents without nipping the documents.

15. The method of claim 9, wherein the step of controlling the speed comprises stopping the horizontal conveyor in response to detecting the characteristic indicative of the number of documents in the corresponding packet exceeding the threshold.

16. The method of claim 15, wherein the step of controlling the speed comprises re-starting the horizontal conveyor in response to detecting the characteristic indicative of the number of documents in the corresponding packet being below a second threshold.

17. The method of claim 9, wherein the threshold is greater than two documents.

18. The method of claim 9, wherein the step of detecting comprises detecting the characteristic indicative of distinguishing a packet of two or more documents from a thick packet of documents having the number of documents that exceeds a predetermined threshold.

* * * * *